Nov. 22, 1966 D. A. VENN ET AL 3,287,655

DIGITAL CONTROL FOR DISCIPLINING OSCILLATORS

Filed Nov. 30, 1964 2 Sheets-Sheet 1

INVENTORS
DOUGLAS A. VENN
DONALD H. JONES

BY James G. Murray
R. Sciascia
ATTORNEYS

DIGITAL CONTROL FOR DISCIPLINING OSCILLATORS

Filed Nov. 30, 1964 2 Sheets-Sheet 2

INVENTORS
DOUGLAS A. VENN
DONALD H. JONES

BY James G. Murray
R. S. Sciascia
ATTORNEYS

United States Patent Office 3,287,655
Patented Nov. 22, 1966

3,287,655
DIGITAL CONTROL FOR DISCIPLINING OSCILLATORS

Douglas A. Venn and Donald H. Jones, Washington, D.C., assignors to the United States of America as represented by the Secretary of the Navy Filed Nov. 30, 1964, Ser. No. 414,921
5 Claims. (Cl. 331—14)

The invention described herein may be manufactured and used by or for the Government of the United States of America for governmental purposes without the payment of any royalties thereon or therefor.

The present invention relates to a controlled oscillator system and more particularly to a wide band, highly stable control system for disciplining oscillators.

In many and diverse electronic installations the need arises for a system wherein any number of electronic oscillators can be frequency disciplined, or controlled, by a central reference frequency source. Generally, the prior art systems for disciplining oscillators utilize frequency and/or phase comparators or other analog error signal producing devices which are inherently narrow banded and comparatively unstable.

In order to avoid the undesirable features of the prior art systems, while providing the desired disciplining of oscillators, the present system operates in a digital mode wherein a digital error signal is used to control the disciplined oscillators. Inasmuch as the digital mode inherently does not have narrow band limitations, and in distinction to prior systems, the invention advantageously is operable both over a wide frequency range and with relatively large error signals.

It is, therefore, an object of the present invention to provide an oscillator disciplining system which is not subject to narrow band limitations.

Another object is to provide a system for frequency controlling any number of oscillators which is stable and operable over a wide frequency range.

A still further object of the present invention is to provide an oscillator disciplining system which operates in the digital mode and which utilizes a digital error signal.

Other objects and advantages of the invention will hereinafter become more fully apparent from the following description and the annexed drawings, which illustrate a preferred embodiment, and wherein.

Figure 1:
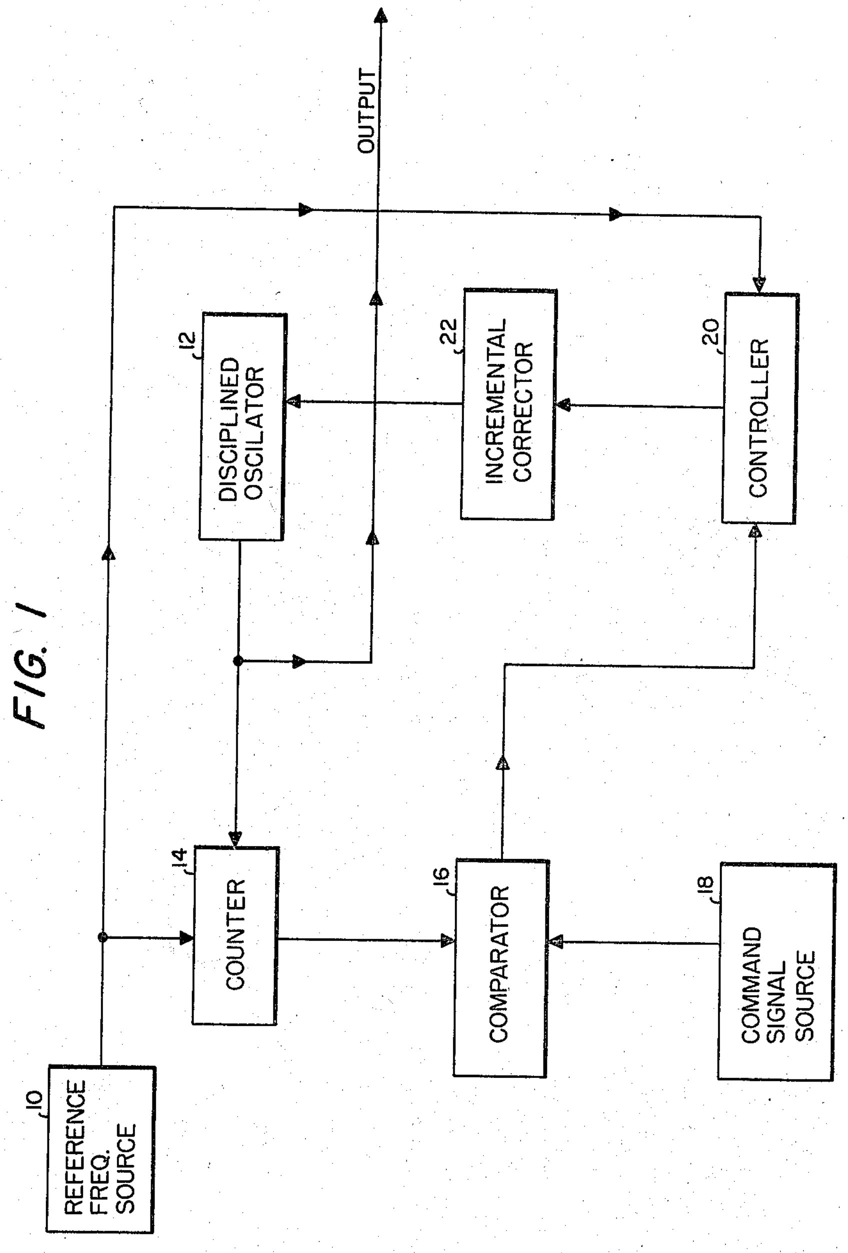
FIG. 1 is a block diagram of the invention.

Referring now to FIG. 1, reference numeral 10 identifies a signal source which provides a highly stable reference frequency. This frequency remains constant regardless of any changes in the desired frequency of the disciplined oscillator 12 because the reference frequency is used only for timing purposes. More specifically, source 10 is connected to and controls counter 14 to count the signal cycles produced by disciplined oscillator 12 during a time period fixed by reference source 10.

Counter 14 produces an output signal which is digital in nature and which is related to the actual frequency of disciplined oscillator 12, or more precisely, is digitally definitive of the number of signal cycles produced by disciplined oscillator 12 in the fixed time period. The output of counter 14 is connected to comparator 16. Comparator 16 is also connected to command signal source 18 which is adjusted by the operator to produce in digital form a command signal which defines the desired frequency for the disciplined oscillator 12. More precisely, the output signal from command signal source 18 is digitally definitive of the number of signal cycles which disciplined oscillator 12 will produce in the fixed time period if this oscillator is operating at the desired frequency. Comparator 16 functions to provide an output signal which is digital in form and is definitive of the digital difference between the commanded and the actual number of signal cycles produced by disciplined oscillator 12 in the fixed time period.

The output of comparator 16 is applied to controller 20, the operational sequences of which are synchronized by the signal from reference frequency source 10. Controller 20 functions to energize the incremental corrector 22 to vary the frequency of oscillator 12 in a direction and to a magnitude such that the output of comparator 16 is nulled.

Figure 2:
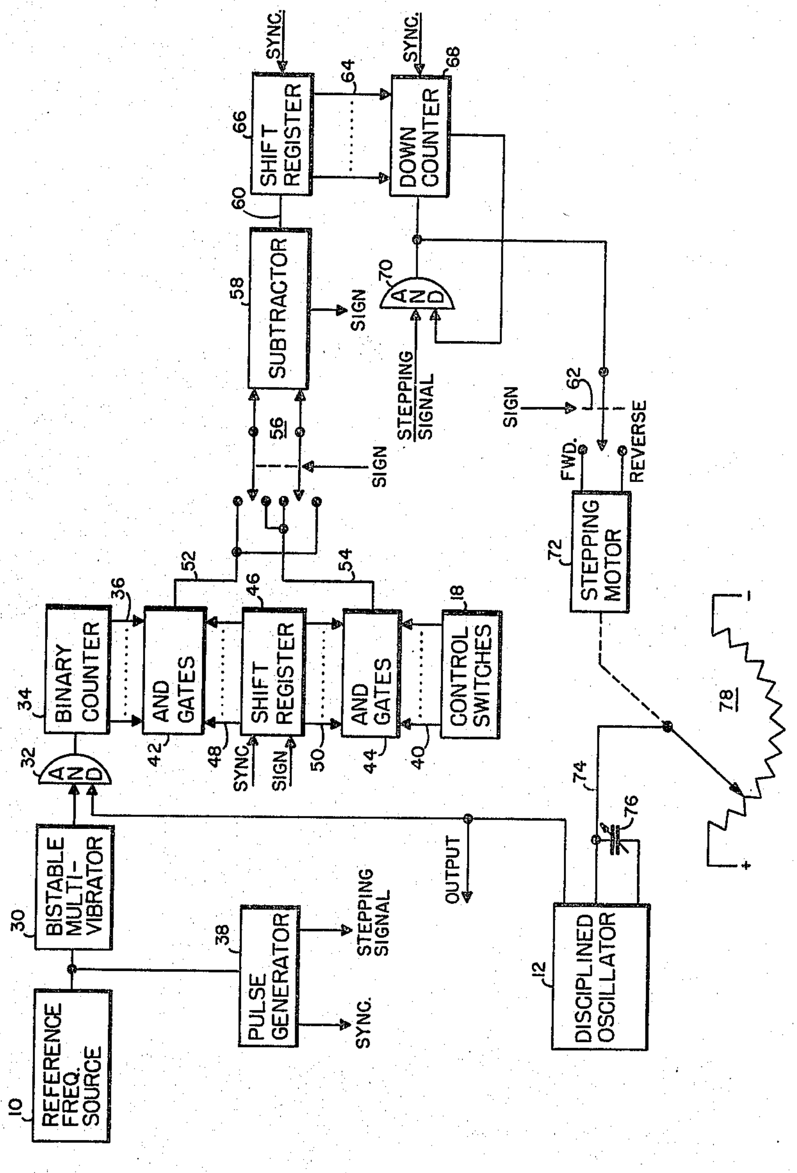
FIG. 2 illustrates the invention in more detail in a functional schematic diagram.

FIG. 2 illustrates the above described embodiment of the invention in more detail. The reference signal source 10 is connected to control bistable multivibrator 30 which is in turn connected to AND gate 32. The output of disciplined oscillator 12 is also connected to AND gate 32. Signals passed by the AND gate 32 are counted by binary counter 34. It will be recognized that bistable multivibrator 30, AND gate 32 and binary counter 34 constitute the counter 14 in FIG. 1 and together function to place a signal on the multiple output leads 36 of binary counter 34 which is digitally definitive of the number of signal cycles which are produced by disciplined oscillator 12 during the fixed time period measured by bistable multivibrator 30 in response to the highly stable reference frequency signal from source 10. Source 10 also energizes a conventional pulse generator 38 which produces two pulse signals. These signals, which are of different frequencies, are utilized elsewhere in the invention for purposes of synchronization and stepping motor control.

The desired output frequency of disciplined oscillator 12 is fed into the system by manipulation of the control switches of command signal source 18, thereby producing on multiple leads 40 a signal which is digitally definitive, in binary code, of the desired output frequency of disciplined oscillator 12.

In FIG. 2, the comparator 16 of FIG. 1 includes two groups of parallel connected AND gates 42 and 44 and a shift register 46 which is connected by multiple leads 48 and 50 to the two groups of AND gates 42 and 44. When energized by the synchronizing signal from pulse generator 38, the shift register 46 sequentially scans corresponding pairs of gates in the groups of gates 42 and 44 and thereby functions to change the digital signals, binary coded in parallel, in multiple leads 36 and 40, to equivalent digital signals, binary coded in series, in the leads 52 and 54. These series type digital signals, after passing through switch 56, are processed by a subtractor 58, of a type well known in the art, to produce a series type digital signal in lead 60 which defines in binary code the digital difference between the number defined by the signals in leads 36 and 52 and the number defined by the signal in leads 40 and 54. This digital difference signal in lead 60 is, of course, the error signal between the number of signal cycles per fixed time period commanded by control switches 18 and the actual number of cycles produced by disciplined oscillator 12. Subtractor 58, which is also part of comparator 16, functions to determine the sign of the error signal and to produce a signal which controls shift register 46 and switches 56 and 62. More specifically, if the error signal is negative, that is, if the number defined by the digital signal on lead 54 is larger than the number defined by the digital signal on lead 52, the subtractor 58 will produce a "sign" signal which (1) energizes switches 56 to reverse the input of leads 52 and 54 to subtractor 58; (2) energizes shift register 46 to again scan AND gate groups 42 and 44, thereby reproducing the previous digital signals, binary coded in series, in leads 52 and 54 and (3) energizes switch 62 for correction control purposes which are explained later.

The digital error signal, which is in binary coded series form in lead 60, is converted into an equivalent signal in parallel form in multiple leads 64 by synchronized shift register 66. The down counter 68 (and the accompanying AND gate 70) are well known devices and function in the conventional manner. More specifically, the down counter 68 is energized by the signal in leads 64 to produce a signal which opens gate 70 until (and only until) the number of stepping signal pulses from pulse generator 38 passes by AND gate 70 equals the number defined by the binary coded signal in leads 64. The pulses passed by AND gate 70 are also connected via switch 62, which is properly positioned by the "sign" signal from subtractor 58, to the appropriate terminal of stepping motor 72. This motor, depending upon the position of switch 62, is energized by the pulses passed by gate 70 to either increase or decrease the potential placed on lead 74 and variable capacitor 76 by potentiometer 78. Variable capacitor 76 can be one of the commercially available components, such, for example, as are known by the trade names of Varactor or Varicap, which vary in capacitance in response to changes in applied voltage. This change of capacitance in element 76 also changes, in an obvious manner, the frequency of disciplined oscillator 12, so that the frequency of this oscillator will conform to the frequency commanded by control switches 18.

In FIG. 2 the shift register 66 and down counter 68, and the circuitry associated therewith, are representative of the controller 20 of FIG. 1 and stepping motor 72 and potentiometer 78 comprise the incremental corrector 22 of FIG. 1.

When using the embodiment of the invention illustrated in FIG. 2, the operator manipulates the control switches 18 to command the frequency desired of disciplined oscillator 12. Signals representing the actual and desired frequency are placed on multiple leads 36 and 40. Shift register 46 changes these binary coded parallel signals to binary coded series signals in leads 52 and 54. Subtractor 58 and shift register 66 cooperate to both place a digital signal in binary coded parallel form on down counter 68 and to control the direction of movement of stepping motor 72 which is energized under the control of down counter 68. Stepping motor 72 is mechanically linked to potentiometer 78 which functions to place a potential on capacitor 76 such that disciplined oscillator 12 will produce an output signal of the desired frequency. It will be obvious that the above described frequency correction process can be either continuously or intermittently applied.

Although, for purpose of clarity, only one disciplined oscillator system has been illustrated, it is evident that any number of disciplined oscillators, operating at different commanded frequencies, can be operated in conjunction with reference frequency source 10, bistable multivibrator 30 and pulse generator 38.

It is apparent that there has been disclosed an oscillator disciplining system which operates in the digital mode and which utilizes a digital error signal and which is not subject to narrow band limitations.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An oscillator disciplining system comprising:
   - a variable frequency oscillator which includes a control for changing the oscillator frequency;
   - timing means for defining a fixed time period and including a stable reference frequency source, a bistable multivibrator connected to said source and an AND gate connected to said multivibrator;
   - command means for producing a first digital signal related to the desired frequency of said oscillator;
   - counter means controlled by said timing means and connected to said oscillator through said AND gate for producing a second digital signal related to the number of signal cycles produced by said oscillator in a fixed time period;
   - comparator means connected to receive said first and second digital signals and to produce a third digital signal related to the digital difference of said first and second digital signals; and
   - controller means connected to receive said third digital signal and in response to said third digital signal to change the oscillator frequency to conform with the desired frequency.

2. The oscillator disciplining system of claim 1 wherein said control for changing the oscillator frequency comprises:
   - capacitance means which varies in capacitance in response to an applied voltage and which directly controls the frequency of said oscillator and
   - potentiometer means connected to said capacitance means and controlled by said controller means to apply a variable potential to said capacitance means.

3. The oscillator disciplining system of claim 1 wherein said first digital signal produced by said command means is a binary coded parallel signal and said second digital signal produced by said counter means is also a binary coded parallel signal.

4. The oscillator disciplining system of claim 3 wherein said comparator means includes:
   - shift register means coupled to said command means and to said counter means to convert said binary coded first and second signals from parallel to series form and
   - subtractor means connected to receive said first and second binary coded series signals and to produce said third digital signal.

5. The oscillator disciplining system of claim 4 which further includes a stepping motor connected to be energized in response to said third digital signal and said stepping motor is mechanically linked to said oscillator control.

References Cited by the Examiner

UNITED STATES PATENTS

| | | | |
|---|---|---|---|
| 3,050,693 | 8/1962 | Sinninger | 331—36 |
| 3,185,938 | 5/1965 | Pelosi | 331—14 X |

ROY LAKE, *Primary Examiner.*

S. H. GRIMM, *Assistant Examiner.*